(12) United States Patent
Marrelli

(10) Patent No.: US 7,341,683 B2
(45) Date of Patent: Mar. 11, 2008

(54) METHOD OF MANUFACTURING FOAMED POLYETHYLENE FILMS AND RELATED PRODUCTS

(75) Inventor: John Charles Marrelli, Shreveport, LA (US)

(73) Assignee: Vinxi, L.L.C., Las Vegas, NV (US)

( * ) Notice: Subject to any disclaimer, the term of this patent is extended or adjusted under 35 U.S.C. 154(b) by 0 days.

(21) Appl. No.: 10/349,803

(22) Filed: Jan. 23, 2003

(65) Prior Publication Data

US 2003/0144369 A1 Jul. 31, 2003

Related U.S. Application Data

(62) Division of application No. 09/615,098, filed on Jul. 13, 2000, now abandoned.

(51) Int. Cl.
*B29C 44/20* (2006.01)
(52) U.S. Cl. ............................ 264/54; 264/51
(58) Field of Classification Search ............ 264/51, 264/54; 428/35.2, 35.7, 36.5
See application file for complete search history.

(56) References Cited

U.S. PATENT DOCUMENTS

| | | | |
|---|---|---|---|
| 4,138,534 A * | 2/1979 | Tedesco | 521/79 |
| 4,419,485 A * | 12/1983 | Borman et al. | 525/437 |
| 4,533,578 A * | 8/1985 | Boyd et al. | 428/35.2 |
| 4,600,614 A * | 7/1986 | Lancaster et al. | 428/35.2 |
| 4,677,684 A * | 6/1987 | Gatward | 383/87 |
| 4,868,025 A * | 9/1989 | Strzelewicz | 428/35.2 |
| 5,180,751 A * | 1/1993 | Park et al. | 521/51 |
| 5,912,059 A * | 6/1999 | Jones et al. | 428/35.2 |
| 6,593,005 B2 * | 7/2003 | Tau et al. | 428/516 |
| 6,652,933 B2 * | 11/2003 | Hall | 428/34.2 |

* cited by examiner

*Primary Examiner*—Allan R. Kuhns
(74) *Attorney, Agent, or Firm*—Scully, Scott, Murphy & Presser, P.C.

(57) ABSTRACT

The present invention solves the problems left unaddressed by the prior known processes by providing a method to produce foamed-thermoplastic films of sufficient strength for use in consumer trash-bag applications utilizing high strength thermoplastic resins. Most broadly, the present invention comprises a blown-film bag formed from a material comprising a matrix of foamed polyolefin-based film and gaseous cells formed from a foaming agent.

25 Claims, 3 Drawing Sheets

METHOD OF MANUFACTURING FOAMED POLYETHYLENE FILMS AND RELATED PRODUCTS

RELATED REFERENCES

This application is a divisional of application Ser. No. 09/615,098, filed Jul. 13, 2000 now abandoned.

BACKGROUND OF THE INVENTION

1. Field of the Invention

The present invention provides a method for manufacturing foamed-thermoplastic films for use in blown-film applications such as bags.

2. Description of the Related Art

The terms "thermoplastic film" or "film," as used herein, mean thin flexible materials made from thermoplastic resins. Films usually have a thickness of not greater than 0.25 millimeters (mm). These materials are used particularly in blown-film applications such as consumer trash-bags, grocery bags, produce bags, pallet wrap, food wrap, liners and the like. Films should be distinguished from other more rigid articles including sheets, tubes, boards and plates.

In the thermoplastic film industry, there is a need to produce thicker thermoplastic films at a cost savings to the film manufacturer. Negative consumer perceptions about thinner films currently being manufactured, recent high resin costs, and very low industry profit margins have created this need. This is especially true in the consumer trash-bag industry where intense competition has eroded already thin profit margins, and raw material costs are a very large component of production costs. Within the past several years, trash-bag manufacturers have been producing thinner films as a result of the advent of high-strength polymer resins. These high-strength polymer resins have enabled manufacturers to down-gauge the thickness of the film and still maintain the same toughness and strength of the film. Although this ability to down-gauge has resulted in a small cost savings to the manufacturer, consumers have not been satisfied with these new thinner films, especially when used in consumer trash-bags, as they perceive the bags to be too flimsy, too thin, and difficult to open.

If a trash-bag manufacturer were to address these consumer concerns by manufacturing bags made from thicker thermoplastic films using known processes, he must use more thermoplastic resin, which results in a significant cost increase to himself that he cannot pass on to the consumer. Further, the use of additional resin results in an increased amount of nonbiodegradeable waste that must be disposed of in places such as landfills. This is particularly bothersome given that oil, the raw material for plastics, is a nonrenewable resource. Increasing the thickness of the film used to make the bag to satisfy consumers, while retaining an ability to reduce the amount of thermoplastic resin used to create the film, presents a significant advantage to a manufacturer—not only in terms of cost savings, but also in terms of consumer satisfaction with his product. It would therefore be desirable if an improved method were available for producing thicker thermoplastic films that are more satisfying to consumers without using additional thermoplastic resin so that the consumer trash-bag manufacturer would be able to retain his cost-advantage that he has obtained through down-gauging. Additionally, it would be desirable if an improved method were available for producing thinner yet more satisfying films using even less thermoplastic material than is currently being used. It would also be desirable if such films retained adequate toughness and strength wherein the film could be used effectively in consumer trash-bags.

Although it is known that thicker films can be produced via a foaming process, conventional foamed-thermoplastic films do not have sufficient physical characteristics to be utilized in consumer trash-bags due to their reduced mechanical, impact and tensile strength. For instance, Francis C. Shea's article "Processing Foam Film,"(1977) discloses that tensile strength, impact strength, and elongation decrease as the density of a foamed film decreases. A foamed film's density is inherently reduced by the foaming process; therefore, its physical properties are necessarily adversely affected. Consequently, it is not practical to use conventional foamed-thermoplastic films in blown-film applications like trash-bags. Furthermore, heretofore known processes for foaming thermoplastic films produce gaseous cells of uneven structure, which give surface irregularities and poor appearance to the resulting film, thereby yielding products of limited commercial value.

Therefore, there is an unaddressed need for thicker thermoplastic films that can be used effectively in commodity blown-film applications that require toughness and strength such as consumer trash-bags. Such films should have a pleasing appearance and feel to the consumer, and should furnish the manufacturer with the ability to reduce the amount of thermoplastic resin used to produce thinner films.

SUMMARY OF THE INVENTION

The present invention solves the problems left unaddressed by prior known processes by providing a method utilizing high strength thermoplastic resins to produce thicker films having sufficient toughness and strength for use in consumer trash-bag applications via a foaming process. Another object of the present invention is to produce films that are more satisfying to consumers and less expensive for manufacturers. It is an additional object of this invention to produce foamed films from high strength resins such that the physical properties of the films are not affected significantly by the foaming process. It is still another object of this invention to use such foamed films effectively in consumer trash-bag applications. Although it is known to add foaming agents to thermoplastic resins to produce foamed films, it has now been found that such films can be produced with sufficient strength to be useful in consumer trash-bag applications. The films of the present invention may be produced to have a thicker appearance, a smooth pearlescent finish, and a pleasing feel. Furthermore, these films have enhanced physical properties, which lead to the production of more satisfying trash bags.

Most broadly, this invention comprises a blown-film bag formed from a foamed-thermoplastic film. This foamed-thermoplastic film is comprised of a base resin and a foaming agent. In one embodiment of the invention, polyethylene is used as the base resin. In another embodiment, polyethylene is used as the base resin and modified sodium bicarbonate is used as the foaming agent. In yet another embodiment, metallocene catalyzed polyethylene is used as a component of the base resin.

Once the foamed film is manufactured, a stronger, more satisfying blown-film bag is produced via a blown-film and heat-sealing process.

Other advantages of the present invention will be apparent to those skilled in the art in view of the following specification, claims and drawings.

DESCRIPTION OF THE FIGURES

For a more complete understanding of the present invention and advantages thereof, reference is now made to the following description taken in conjunction with the accompanying drawings in which like reference numbers indicate like features, and wherein.

DETAILED DESCRIPTION

Figure 1:
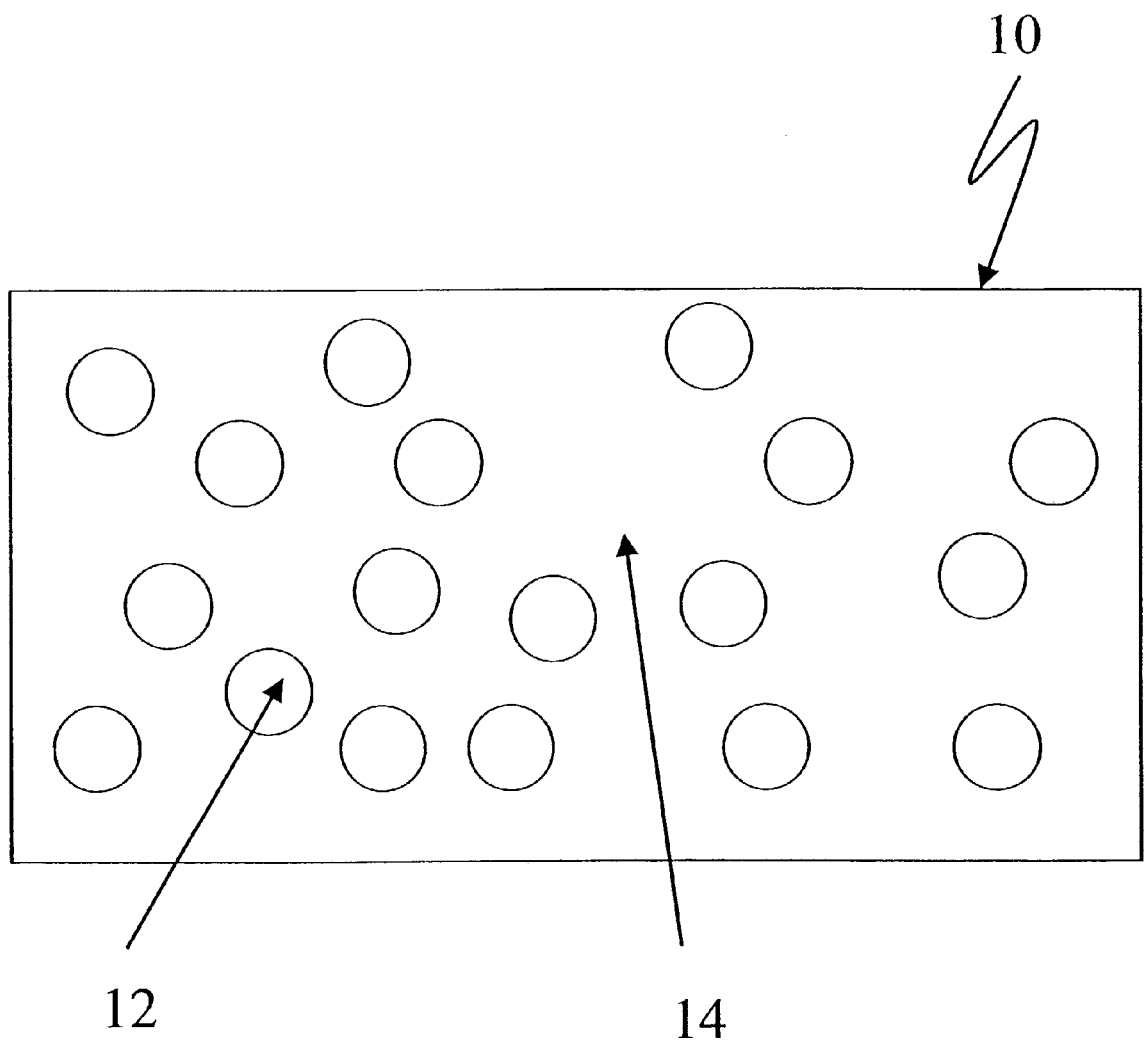
FIG. 1 is a representative cross-section of a foamed-thermoplastic film.

FIG. 1 shows generally at 10 a cross-section of a foamed film having base resin matrix 14 and gaseous cells 12. Foamed-thermoplastic films of the present invention are made in a continuous process by mixing a base resin and a foaming agent. This foaming agent/resin mixture is processed in an extruder to produce a melt. In the extruder, when heated to the correct temperature, the foaming agent introduces a gas phase (either by decomposing or vaporizing) into the thermoplastic or polymeric melt. The gas produced by the foaming agent remains dispersed in the melt until the melt exits the die at 24. (FIG. 2) The melt from the extruder is processed on a blown-film line. The result is a foamed-thermoplastic film comprised of base resin matrix 14 and gaseous cells 12. (FIG. 1) The foamed-thermoplastic film is subsequently heat-sealed to form blown-film bags having sufficient toughness and strength to be useful to consumers.

Base resin matrix 14 should have high melt strength, high melt viscosity, high elasticity, and high surface tension. Also, the particular base resin utilized should produce films with high impact strength, good puncture resistance, and good sealability. While any of the well-known polyolefin film resins may be used as the compositions of base resin matrix 14, polyethylene-based resins are most generally employed. Suitable polyethylenes include very low density polyethylene ("VLDPE"), ultra-low density polyethylene ("ULDPE"), low density polyethylene ("LDPE"), linear low density polyethylene ("LLDPE"), medium density polyethylene ("MDPE"), and high density polyethylene ("HDPE"), any of which may be produced using Ziegler-Natta, chromium or metallocene polymerization catalysts. As used herein, the term "polyethylene" encompasses not only homopolymers of ethylene, but also copolymers of ethylene, which include, but are not limited to, copolymers of ethylene and $C_3$-$C_8$ α-olefins. As used herein, the term "copolymer" means a polymer comprising ethylene and one or more comonomers. Ethylene terpolymers and quattropolymers may also be used in the present invention. Particularly suited for this invention are metallocene catalyzed polyethylene resins. In one embodiment in particular, metallocene catalyzed ethylene-hexene and ethylene-octene copolymers are used as base resin matrix 14. In another embodiment, metallocene catalyzed ethylene-butene copolymers are used as base resin matrix 14. The preparation of such resins is well-known. Such resins may be modified with substances such as ethylene vinyl acetate for use in the present invention before addition of the foaming agent or after. Without the addition of a foaming agent, as disclosed herein, such resins as used to manufacture trash bags using traditional blown-film methods typically have a density in the range of 0.87 g/cm³ to about 0.97 g/cm³.

The foaming agent used in the present invention may be added to the base resin prior to the extrusion process. If added to the base resin prior to the extrusion process, the foaming agent, when used in particulate form, may be compounded with other substances, including but not limited to other polymeric materials, colorants or modifiers, to enhance its performance in the foaming process. Adequately grinding the foaming agent prior to combining it with the base resin may alleviate any problems encountered as a result of agglomeration of the foaming agent in the melt. This grinding process is particularly useful when using low levels of the foaming agent component. In one embodiment of this invention, a powdered form of a modified sodium bicarbonate foaming agent is pre-mixed with the base resin and a wetting agent in a tumbling process prior to placing it in the extrusion apparatus.

The foaming agent may also be added after the base resin has been placed in the extruder by adding it to the barrel of the extruder using an auxiliary extruder.

Powdered foaming agents may be added by conventional feeding systems, such as hoppers, on either a volume or a weight basis. It should be noted, however, that using a powdered foaming agent may result in dispersion problems that can lead to agglomeration of the foaming agent in the melt. If agglomerations form, very large gaseous cell 12 structures may result that can cause pinholes in the film. The foaming agent may be added in a liquid form through an injection port on the extruder. Further, the foaming agent may be added in a gaseous form during extrusion once the base resin has been partially melted.

Appropriate foaming agents can be any known organic or inorganic compounds that decompose at elevated temperatures releasing gases such as air, nitrogen, carbon dioxide, carbon monoxide, or other hydrocarbons. Suitable organic foaming agents that may be utilized in this invention include azodicarbonamide and modified azocarbonamide, i.e., azodicarbonamide modified with zinc oxide, calcium carbonate or the like to lower its decomposition temperature and act as an activator for the foaming agent. Suitable inorganic foaming agents include sodium borohydride, ammonium carbonate, sodium bicarbonate, and modified sodium bicarbonate, i.e., sodium bicarbonate modified with a proton donor such as citric acid. For polyethylene films, the class of foaming agents particularly suited for the process are modified azodicarbonamide and modified sodium bicarbonate.

It is preferable to use foaming agents at levels of about 0.05 to 1.00 parts by weight/per hundred parts by weight of polymer ("pph"), and beneficially from 0.10 to 0.50 pph, depending on the ultimate density of the foamed-thermoplastic film desired.

The decomposition products of the foaming agent that form the gaseous phase or gaseous cells 12 of the foamed-thermoplastic film include air, nitrogen, carbon dioxide, carbon monoxide and other hydrocarbons. Azodicarbonamides generate primarily nitrogen gas into the melt; modified bicarbonates generate primarily carbon dioxide gas into the melt. Ultimately, these gases expire after extrusion and are replaced by air within the film. These gases have relatively low critical points as well as low solubility in the melt.

Additives, such as activators and nucleators, in combination with the chemical-foaming agent, may be used in the present invention to ensure the complete decomposition of the chemical-foaming agent and to control gaseous cell 12 size. Nucleation agents such as talc and other finely divided fillers may be used to assist in gaseous cell 12 formation by providing sites for the cells to form. It is important to note that the foaming agent itself, especially if used in particulate form, may also act as a nucleating agent.

Figure 2:
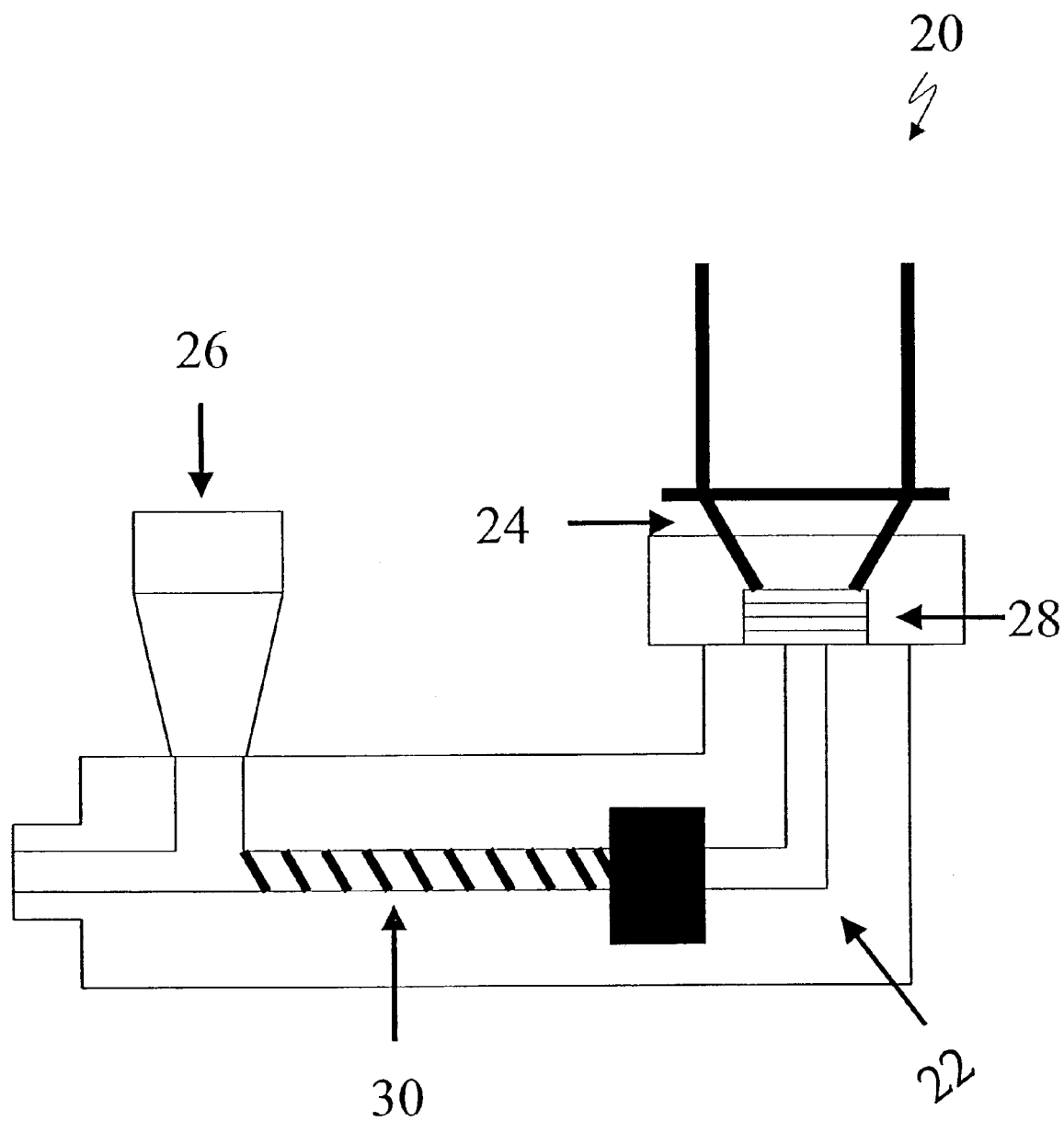
FIG. 2 is a cross-section of a conventional extruder used for making a foamed-thermoplastic film.

FIG. 2 is a cross-section of a typical extruder shown generally at 20 that can be used to manufacture the foamed-thermoplastic film of this invention. The functions of the extruder are three-fold: (1) to plasticate the thermoplastic resin to the proper viscosity so that it can absorb the gas generated by the foaming agent, (2) to intimately mix all components of the resin/foaming agent mixture together, and (3) to maintain the resin/foaming agent mixture under sufficient pressure so that the gas produced by decomposition of the foaming agent remains in solution in the mixture until the mixture is extruded at 24. Standard film extrusion equipment known to those skilled in the art may be used in the present invention provided accurate temperature controls are available to adequately maintain the designated temperatures during the foaming process. In the present invention, however, preferably the screw and the barrel may be polished if powdered foaming agents are to be used. The specific design of extruder screw 30 is dependent on the polymer being processed. The preferred screw length to diameter ratio for the present invention is greater than or equal to 20/1. Speeds at which screw 30 may be operated range from 20 rpm to 100 rpm to maintain a sufficiently high melt pressure in head 22 and die 28. The preferable range is the range necessary to keep the gas in solution until the melt is extruded. If the speed of screw 30 is too high, melt fracture will occur. If too low, the skin will have a shark-skin appearance.

Although the gas released by the foaming agent will plasticize the melt, the general extrusion parameters of the foamed-thermoplastic film will not change relative to a standard non-foamed film. Therefore, suitable pressures for the extrusion process range from about 500 psi to about 4800 psi. Suitable temperatures for the extrusion process range from about 350° F. to about 450° F. The melt pressure preferred in the present invention ranges from about 1500 psi to about 2500 psi; it should be noted that melt pressure is dependant on the size of the extruder, the production rate, and other parameters. The melt temperature preferred in the present invention ranges from about 350° F. to about 425° F. It is important that good temperature control be maintained, particularly in the metering zone and head area. Extruder temperature settings should be such that they gradually increase from feed 32 to die 28 to ensure that the melt temperature over the final quarter of screw 30 is sufficiently high to decompose the foaming agent at the die rather than prematurely decomposing it along the barrell.

Head 22 and die 28 must be designed to maintain uniform material flow. Head 22 volumes should be minimized to avoid possible flow stagnation and decompression. The temperature control zones in head 22 and die 28 should be kept relatively low to maintain melt temperature and pressure uniformity. The primary function of die 28 is to maintain melt pressure. As the surfaces of the melt tend to be warmer, cooling at the die creates a more viscous surface that ultimately will control gaseous cells 12 size and keep gaseous cells 12 from rupturing. However, the benefits achieved by cooling must be balanced against the problems created with excessive viscosity and its associated limits on the expansion of the gas. The preferable design of die 28 is a bottom-fed spiral with a zero land length and minimal die gap. Conventionally, spider type dies have not been recommended when using a foaming agent in film processing due to pressure variations that may result; surprisingly, however, we have found that spider type dies may be used readily in the present invention to achieve satisfactory results.

The key to successful foamed-thermoplastic film production is controlled gaseous cell 12 formation. (FIG. 1) Of the several factors that affect gaseous cell 12 formation, the three most important are the compatibility of the decomposition temperature range of the chemical-foaming agents with the processing temperature range of the base resin, the melt pressure, and the melt temperature. Gaseous cell size 12 depends primarily on the ratio between the amount of dissolved gas and the number of nucleation sites. To obtain satisfactory gaseous cell 12 formation, accurate processing control is critical. As a result of the foaming process, the density of the thermoplastic film of the present invention may be reduced up to 30% or more.

Figure 3:
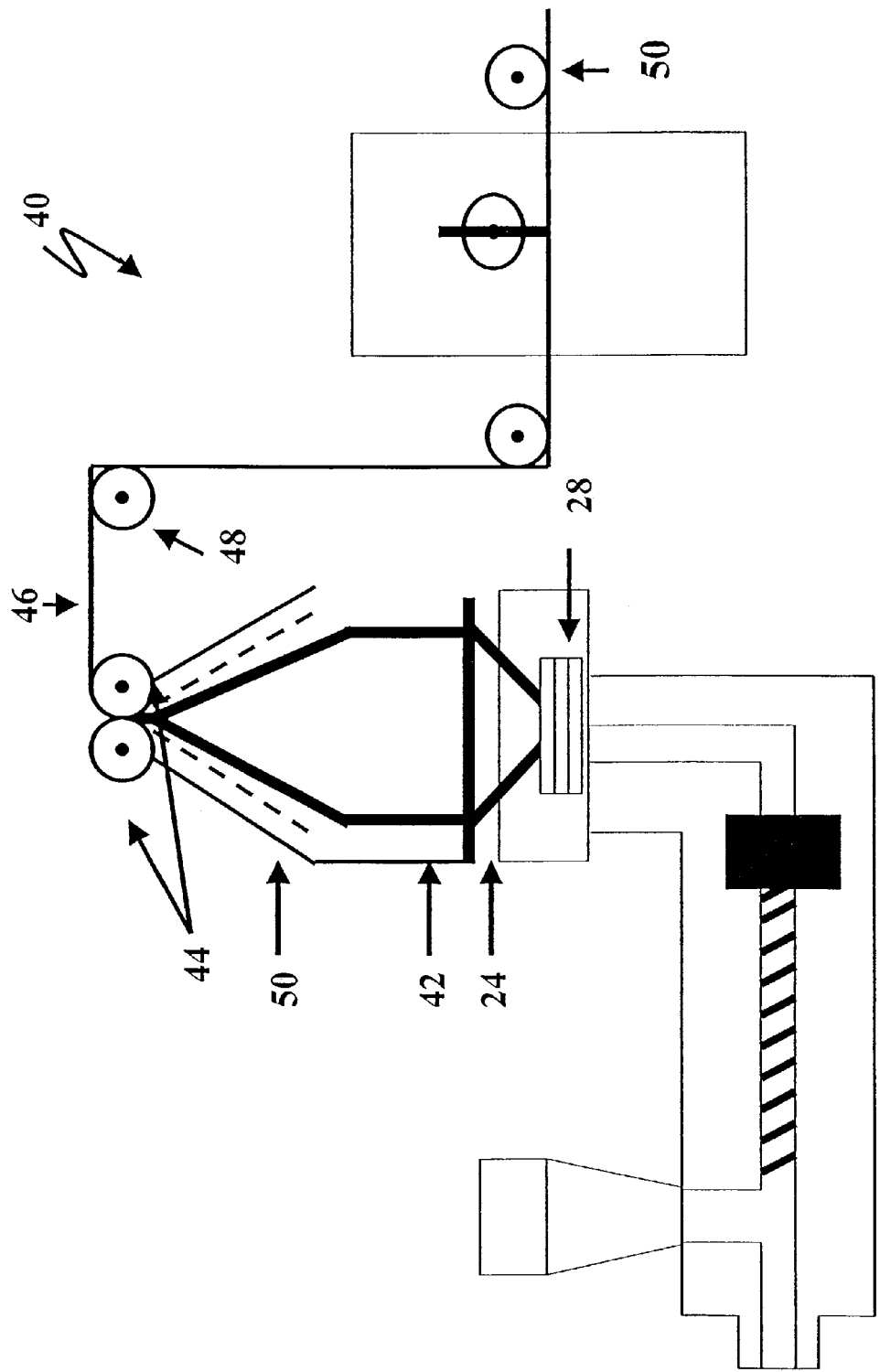
FIG. 3 is a schematic of a conventional film manufacturing process and a heat-sealing process used for making a bag comprised of a foamed-thermoplastic film.

FIG. 3 is a schematic diagram of a film making process shown generally at 40 that can be used to manufacture the foamed-thermoplastic film of this invention. After exiting die 28, extruded film column 42 passes through air ring 24 where the film column 42 is contacted with a cooled air stream. Cooling is perhaps the most difficult part of the foamed-thermoplastic film production process. The cooling capacity of a given extrusion line may be the limiting factor for the production rate of the film. Thermal shock will cause the cells on the surface to shrink resulting in contortions in gaseous cells 12. Therefore, even and gentle cooling is preferable. The temperature range for the cooling process for the present invention is in the range of about 52° F. to about 100° F. The cooling temperature range is preferably about 55° F. to about 85° F. As it is cooled, extruded film column 42 is pulled vertically by nip-rollers 44 from die 28. This pulling action causes the film's thickness to decrease. Film column 42 continues to cool as it rises toward nip-rollers 44. Film column 42 is collapsed upon itself by way of collapsing frame 50, used in combination with nip-rollers 44, which also serve to eliminate the air-gap between the interior sides of extruded film column 42 by bringing the opposing interior sides of extruded film column 42 together. Nip-rollers 44 direct collapsed film 46 to turning rollers 48. It should be noted that stationary turning bars may be used in place of turning rollers 48. Turning rollers 48 direct collapsed film 46 towards the devices that heat seal, and if desired, fold, perforate, cut, or wind it onto additional rollers 50.

The present invention is further illustrated by the following example. While the example illustrates the invention, it is not intended to limit the scope of the invention.

EXAMPLE

By way of example and not limitation, in one embodiment of the present invention, a blend of 89.75% by weight of an ethylene-hexene copolymer (density 0.92 g/cm$^3$, melt index 0.54 g/10 min.), 10.0% by weight of a metallocene catalyzed ethylene-hexene copolymer (density 0.92 g/cm$^3$, melt index 0.70 g/10 min), and 0.25% by weight of a resinous mixture containing 50.0% by weight of a commercially available foaming agent comprising a mixture of citric acid and sodium bicarbonate (50% load of foaming agent and 50% unspecified low density polyethylene resin) were physically mixed together to form a base resin/foaming agent mixture. The mixture was introduced into an Egan (1989) 4.5" 200 h.p. extruder through a conventional hopper-based feeding system. A barrier screw with a 24/1 ratio and Maddock mixing tip was used. The mixture was heated by three sources: the chemical reaction of the foaming agent components, the friction produced by the shear between the screw and the barrel, and the applied heat from the heater bands on the barrel. The temperatures of the five heating zones along the barrel were: 250° F., 294° F., 314° F., 329° F., and 328° F. As compared standard extrusion process, lower barrel temperatures were used to prevent the foaming reaction from taking place before the melt exited the die. The temperature at the neck was 366° F., and the temperature at the die was 370° F. The chemical foaming reaction took place at the die. The line rate was 438 pounds per hour at 138 linear feet per minute. Screw speed was 24 rpm. The melt was pulled from the die through a Western dual lip air ring into the cooling tower by nip rollers. Concurrently, air was blown inside the film column to form a bubble. The air ring provided chilled air (59° F.) to establish a frost line 12 inches above the die. The resulting film web was heat sealed, perforated, cut and wound onto rolls using conventional trash bag production equipment. The sealing process was conducted at 350° F. with a half second dwell time at 20 psi of pressure.

Tensile tests were conducted on the resulting foamed film. The tensile strength of the foamed film (448 psi) was comparable to that of an unfoamed polyethylene film (439 psi) but the gauge of the film increased significantly. The gauge of the foamed film was 1.20 mil whereas the gauge of an unfoamed polyethylene film, when made from the same ethylene-hexene base resin as the foamed film, was 1.00 mil. This is a significant increase in thickness that will enhance consumer perceptions about the resulting products made from such films. Also, the manufacturer has maintained his ability to down-gauge by using the same amount of resin to produce this thicker film.

Although the present invention has been described in detail, it should be understood that various changes, substitutions, and alterations can be made hereto without departing from the spirit and scope of the invention as defined by the appended claims.

What I claim is:

1. A method of manufacturing a foamed-polyethylene blown-film bag comprising:
   providing a base polyethylene resin;
   providing a foaming agent;
   adding the foaming agent to the base polyethylene resin to form a foaming agent/base polyethylene resin mixture;
   processing the foaming agent/base polyethylene resin mixture by passing the foaming agent/base polyethylene resin mixture through an extruder that comprises at least a feed and a die and has varying temperature settings that gradually increase from the feed to the die to form a single-ply foamed polyethylene film having a density that is less than that of an unfoamed film formed by the same base polyethylene resin and a tensile strength that is not less than that of the unfoamed polyethylene film; and
   forming a bag from the single-ply foamed polyethylene film.

2. The method of claim 1 wherein the base polyethylene resin is produced by a catalyst comprised of a metallocene.

3. The method of claim 1 wherein the foaming agent is selected from a group consisting of azodicarbonamide, modified azodicarbonamide, sodium borohydride, sodium bicarbonate, and modified sodium bicarbonate.

4. The method of claim 1 wherein the foaming agent/base polyethylene resin mixture comprises ethylene vinyl acetate.

5. The method of claim 1 wherein the base polyethylene resin comprises ethylene vinyl acetate.

6. The method of claim 1 wherein the base polyethylene resin is comprised of ethylene-butene, ethylene-hexene or ethylene-octene copolymer.

7. The method of claim 1, wherein the die provides a melt temperature ranging from about 350° F. to about 450° F. and a melt pressure ranging from about 500 psi. to about 4800 psi.

8. The method of claim 1, wherein the die provides a melt temperature ranging from about 350° F. to about 425° F. and a melt pressure ranging from about 1500 psi. to about 2500 psi.

9. The method of claim 1, wherein the extruder has five or more different temperature settings ranging from about 250° F. to about 370° F.

10. The method of claim 1, wherein cooling is provided at the die by using a cooled air stream having a temperature from about 52° F. to about 100° F.

11. The method of claim 1, wherein cooling is provided at the die by using a cooled air stream having a temperature from about 55° F. to about 85° F.

12. A method of manufacturing a foamed-polyethylene consumer trash-bag comprising:
    providing a base polyethylene resin;
    providing a foaming agent;
    adding the foaming agent to the base polyethylene resin to form a foaming agent/base polyethylene resin mixture;
    processing the foaming agent/base polyethylene resin mixture by passing the foaming agent/base polyethylene resin mixture through an extruder that comprises at least a feed and a die and has varying temperature settings that gradually increase from the feed to the die to form a single-ply foamed polyethylene film having a density that is less than that of an unfoamed polyethylene film formed by the same base polyethylene resin and a tensile strength that is not less than that of the unfoamed polyethylene film; and
    forming a consumer trash-bag from the single-ply foamed polyethylene film.

13. The method of claim 12 wherein the polyethylene resin is selected from the group consisting of ultra low density polyethylene ("ULDPE"), very low density polyethylene ("VLDPE"), low density polyethylene ("LDPE"), linear low density polyethylene ("LLDPE"), medium density polyethylene ("MDPE"), and high density polyethylene ("HDPE").

14. The method of claim 12 wherein the base polyethylene resin is produced using a catalyst comprised of a metallocene.

15. The method of claim 12 wherein the foaming agent is modified sodium bicarbonate.

16. The method of claim 12 wherein the base polyethylene resin comprises ethylene vinyl acetate.

17. The method of claim 12 wherein the foaming agent is azodicarbonamide, modified azodicarbonamide, sodium borohydride, sodium bicarbonate, or modified sodium bicarbonate.

18. The method of claim 12 wherein the foaming agent/base polyethylene resin mixture comprises ethylene vinyl acetate.

19. The method of claim 12 wherein the base polyethylene resin comprises ethylene-butene, ethylene-hexene or ethylene-octene copolymer.

20. A method for manufacturing a single-ply foamed polyethylene film comprising the steps of:
    providing a base polyethylene resin;
    providing a foaming agent;

adding the foaming agent to the base polyethylene resin to form a foaming agent/base polyethylene resin mixture; and processing the foaming agent/base polyethylene resin mixture by passing the foaming agent/base polyethylene resin mixture through an extruder that comprises at least a feed and a die and has varying temperature settings that gradually increase from the feed to the die to form a single-ply foamed polyethylene film having a density that is less than that of an unfoamed polyethylene film formed by the same base polyethylene resin and a tensile strength that is not less than that of the unfoamed polyethylene film.

21. The method of claim 20 wherein the base polyethylene resin is produced by a catalyst comprised of a metallocene.

22. The method of claim 20 wherein the foaming agent is selected from a group consisting of azodicarbonamide, modified azodicarbonamide, sodium borohydride, sodium bicarbonate, and modified sodium bicarbonate.

23. The method of claim 20 wherein the foaming agent/base polyethylene resin mixture comprises ethylene vinyl acetate.

24. The method of claim 20 wherein the base polyethylene resin comprises ethylene vinyl acetate.

25. The method of claim 20 wherein the base polyethylene resin comprises ethylene-butene, ethylene-hexene or ethylene-octene copolymer.

* * * * *